United States Patent [19]
Morikawa

[11] Patent Number: 5,205,844
[45] Date of Patent: Apr. 27, 1993

[54] DEGASSING APPARATUS

[75] Inventor: Hideyuki Morikawa, Tokyo, Japan

[73] Assignee: Uniflows Co., Ltd., Tokyo, Japan

[21] Appl. No.: 796,353

[22] Filed: Nov. 22, 1991

[30] Foreign Application Priority Data

Nov. 30, 1990 [JP] Japan .................. 2-336625

[51] Int. Cl.$^5$ .............................................. B01D 53/22
[52] U.S. Cl. ...................................... 55/158; 55/160; 55/189
[58] Field of Search ................. 55/16, 55, 158–160, 55/189, 190

[56] References Cited

U.S. PATENT DOCUMENTS

| | | | |
|---|---|---|---|
| 3,193,988 | 7/1965 | Kudlaty | 55/189 X |
| 3,751,879 | 8/1973 | Allington | 55/189 X |
| 4,325,715 | 4/1982 | Bowman et al. | 55/189 X |
| 4,469,495 | 9/1984 | Hiraizumi et al. | 55/189 |
| 4,696,684 | 9/1987 | Shen | 55/189 X |
| 4,729,773 | 3/1988 | Shirato et al. | 55/159 X |
| 4,986,837 | 1/1991 | Shibata | 55/190 |
| 5,009,682 | 4/1991 | Hagelauer | 55/160 X |
| 5,044,761 | 9/1991 | Yuhki et al. | 55/190 X |
| 5,045,096 | 9/1991 | Quang et al. | 55/159 |

FOREIGN PATENT DOCUMENTS

| | | | |
|---|---|---|---|
| 58-219067 | 12/1983 | Japan | 55/159 |
| 62-132509 | 6/1987 | Japan | 55/189 |
| 63-258605 | 10/1988 | Japan | 55/159 |
| 3-032792 | 2/1991 | Japan | 55/189 |
| 0980760 | 12/1982 | U.S.S.R. | 55/160 |

*Primary Examiner*—Robert Spitzer

[57] ABSTRACT

A degassing apparatus in which a tube made of permeable film is laid in a vacuum chamber which is decompressed and controlled by a vacuum pump, and a liquid flowing in the tube is degassed by causing gas to permeate through the wall of the tube. The degassing apparatus comprises a valve for opening the vacuum chamber toward the atmosphere and/or a permeable film which is placed between the vacuum chamber and the atmosphere and/or a valve for opening the vacuum pump to the atmosphere which is disposed between the primary valve and the primary cylinder of the vacuum pump. This degassing apparatus can be very small in size and can operate stably.

2 Claims, 3 Drawing Sheets

DEGASSING APPARATUS

FIELD OF THE INVENTION AND RELATED ART STATEMENT

The present invention relates to a computerized degassing apparatus of a very small size to deal with a small amount of liquid in association with analytical equipment, examination equipment, experiment equipment and the like.

In the field of analytical equipment, medical devices and the like, there have been known methods in which a tube made of permeable film is laid in a vacuum chamber which is decompressed by a vacuum pump under control, and in which a liquid to be degassed flows in said tube and gas is removed from the liquid by causing gas to permeate through the wall of said tube.

However, conventional apparatuses have been large in size as a whole, because they are equipped with a vacuum pump of very high exhaust speed compared with the volume of permeating gas only to deal with a small amount of liquid permeating through the tube of permeable film along with the gas.

OBJECT AND SUMMARY OF THE INVENTION

An object of the present invention is to solve such a problem of the conventional apparatus and provide a degassing apparatus which is small in size and performs stably.

The apparatus of the present invention prevents vacuum pumps from significantly reducing their exhaust speed because of the liquid permeating through the tube of permeable film, thereby enabling the use of smaller vacuum pumps and shortening of the span of time required for bringing the equipment to stable operation.

The gist of the present invention resides in a degassing apparatus in which a tube made of permeable film is laid in a vacuum chamber which is decompressed and controlled by a vacuum pump, and a liquid flowing in said tube is degassed by causing gas to permeate through the wall of said tube, said degassing apparatus further comprising a valve for opening the vacuum chamber toward the atmosphere and/or a permeable film which is placed between the vacuum chamber and the atmosphere and/or a valve for opening the vacuum pump to the atmosphere which is disposed between a primary valve and a primary cylinder of the vacuum pump.

According to the present invention, a degassing apparatus can be very small in size and can operate stably.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

The degassing apparatus of the present invention will be described below, referring to the embodiments illustrated in the accompanying drawings.

Figure 1:
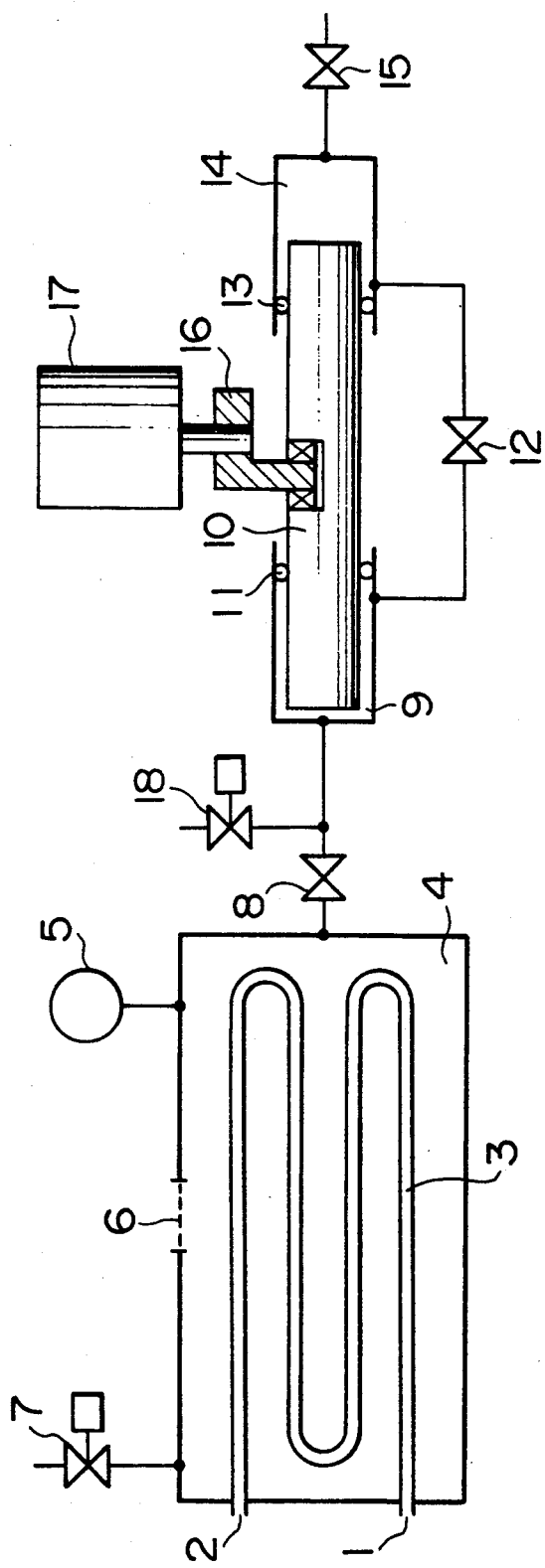
FIG. 1 is a schematic view of the degassing apparatus of the present invention.

FIG. 1 shows an inlet 1 for liquid, an outlet 2 for liquid and a tube 3 made of permeable film. The wall surface of the tube 3 works as a permeable film, and gas is eliminated from the liquid in the tube 3 by permeating through the wall surface. The tube 3 is contained in a vacuum chamber 4 the pressure of which is monitored by a vacuum gauge 5. A permeable film 6 supplies a minuscule amount of the air to the chamber 4 (from the outside). The chamber 4 is exposed to the outside air via an air-exposure valve 7. A vacuum pump comprises the elements designated by reference numerals 8 to 17. The primary side of the vacuum pump is exposed to the outside atmosphere via an air-exposure valve 18. Meanwhile, a controller (not shown) is utilized to regulate the switching on or off of the electric power source and the coordination of the air-exposure valves 7 and 18 and the vacuum pump 8-17 by means of signals from the vacuum gauge 5.

Figure 2:
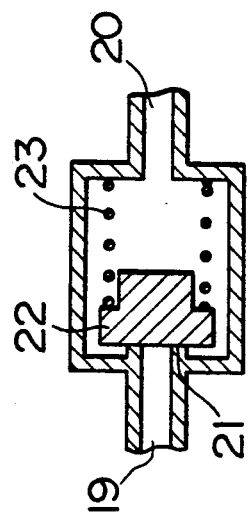
FIG. 2 is a sectional view of a check valve for use in the present invention.

FIG. 2 shows one example of the check valves 8, 12 and 15 shown in FIG. 1. This figure also shows a gas inlet 19, a gas outlet 20, a seat 21, a valve 22 and a spring 23. When the valve 22 is given more force than the spring 23 by the difference between the pressure of the inlet 19 and that of the outlet 20, the valve 22 moves toward the right hand side of the figure to open the flow passage, whereas the valve 22 moves toward the left when it is given smaller forces due to pressure differences than forces by the spring 23, so as to come in contact with the seat 21 and close the passage.

Figure 3:
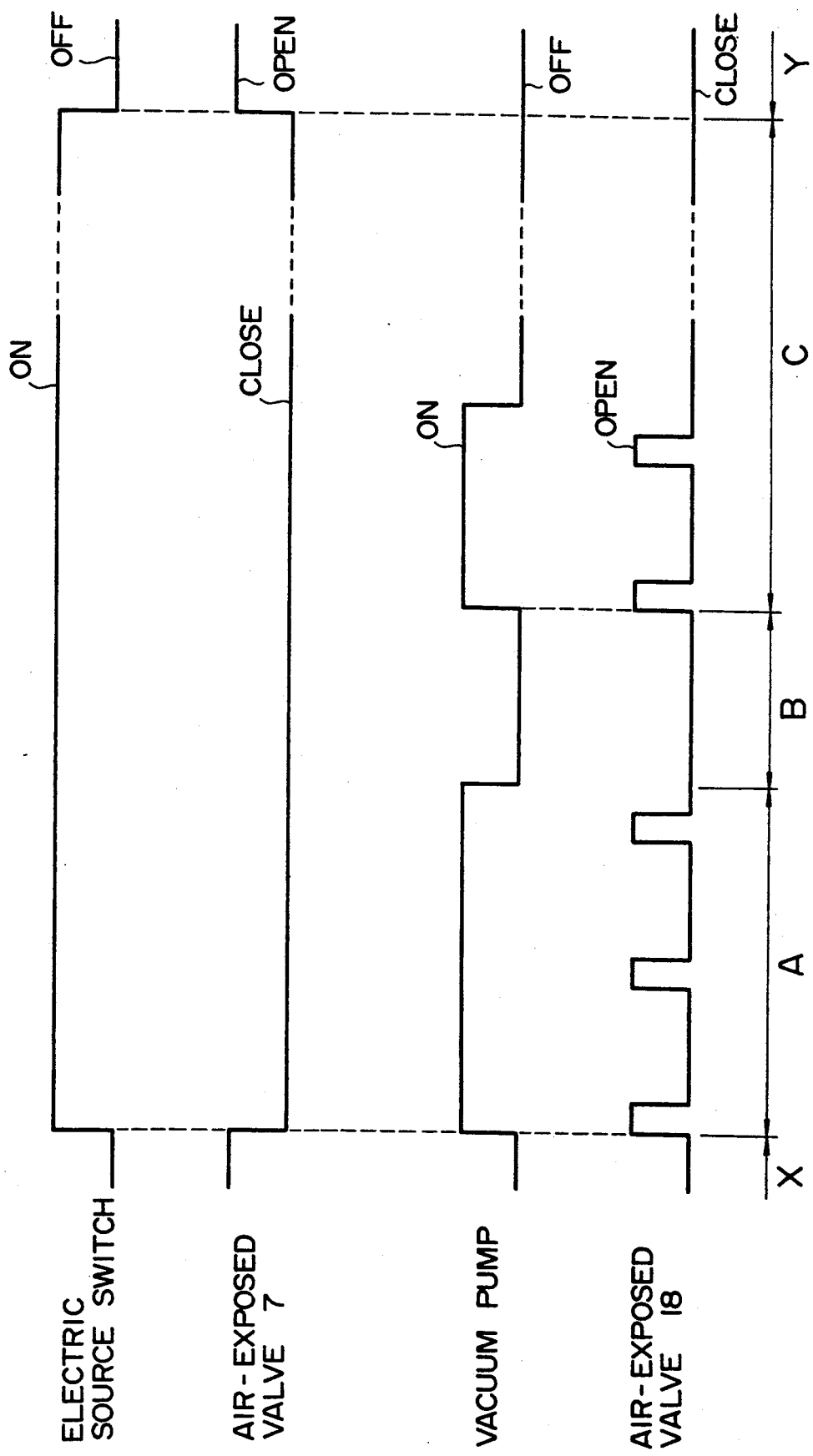
FIG. 3 is a time chart of the vacuum pump and the air-exposed valves for use in the present invention.

FIG. 3 is the time chart of the vacuum pump (8 to 17) and the air-exposure valves 7 and 18.

Next, the performance of the degassing apparatus of the present invention will be described in detail below:

When the electric power source of the apparatus is switched on, the air-exposure valve 7 closes according to a signal from a controller (not shown). Simultaneously, another air-exposure valve 18 opens with the signal from the controller to start the actions shown in section A of FIG. 3 as regulated by a timer contained in the controller. The vacuum pump 8-17 also is turned on by a signal from the controller and sucks the outside air into the apparatus and discharge it through the air-exposure valve 18. Then, the air-exposure valve 18 is closed by the action of the timer, the check valve 8 (primary valve) opens due to the pressure difference between the outlet and the inlet, and the inside of the vacuum chamber 4 is exhausted. Next, the air-exposure valve 18 is opened again by the action of the timer, the check valve 8 is closed due to the pressure difference, and the vacuum pump discharges the air out of the apparatus. This procedure is repeated (corresponding to the opening and closing of the air-exposure valve 18 shown in section A of FIG. 3), until a predetermined pressure is built up inside the vacuum chamber 4, then the output of the vacuum gauge 5 is forwarded to the controller, and the vacuum pump is brought to a halt (turned off) by receiving a signal from the controller (see section B of FIG. 3).

At this point, the liquid to be degassed enters the inlet 1 by the action of an outside pump (not shown) and passes through the tube of permeable film 3 and emerges from the outlet 2. Since the wall of the tube 3 is permeable, gas contained in the liquid is allowed to permeate the wall surface and eliminated by means of the difference between the internal pressure and external pressure (i.e., the pressure inside the vacuum chamber 4) of the tube 3. However, a small amount of the liquid also permeates and emerges from the tube 3 along with the gas, and transforms into vapor (gas). The vacuum gauge 5 senses the deterioration of the degree of vacuum due to the permeating gas when it occurs, and the controller again acts upon the vacuum pump to regulate the pressure within the chamber 4 by opening or closing the air-exposure valve 18 according to substantially the same procedure as in section A described above (corresponding section C of FIG. 3) until the degree of vacuum is stabilized at the predetermined level.

Next, the movement of gas inside the vacuum pump will be described.

Figure 4:
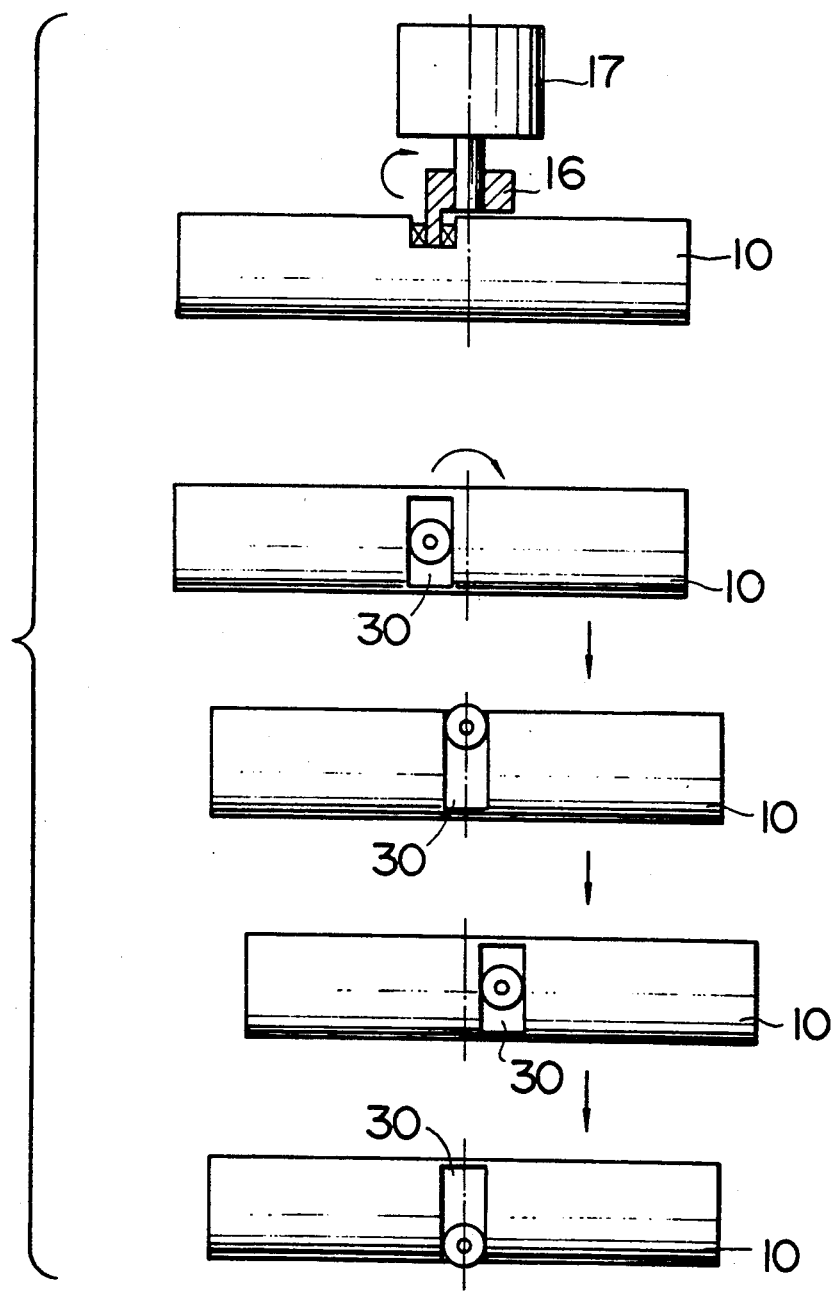
FIG. 4 is a schematic view of the movements of a plunger on the vacuum pump.

As shown in FIG. 4, a plunger 10 has a cam channel 30 cut out in its center and moves back and forth in the right and left directions as regulated by the cam channel 30, an eccentric cam 16 and a motor 17. The cylinders 9 and 14 are spaced from the plunger 10 in a sealed manner by means of seals 11 and 13. When the plunger 10 moves toward the right, the pressure in the cylinder 9 (primary cylinder) is brought down. When the difference between the pressure in the chamber 4 and that in the cylinder 9 is higher than the working pressure of the check valve 8, the check valve 8 opens and the gas in the chamber 4 enters the cylinder 9. Simultaneously, when the pressure in the cylinder 14 becomes higher than the working pressure of the check valve 15, the gas in the cylinder 14 is discharged through the check valve 15. When the plunger 10 stops moving, the pressure difference is brought down lower to close the check valves 8 and 15.

Then, the plunger 10 moves to the left, the pressure in the cylinder 9 is elevated while that in the cylinder 14 is lowered. The check valve 12 opens and the gas in the cylinder 9 enters the cylinder 14. This is repeated to reduce the pressure in the chamber 4 to a vacuum in the substantially same way as generally available cascade pumps.

However, in the case where a liquid to be degassed has a low boiling point and a high vapor pressure, such as an organic solvent, if the vacuum chamber 4 is left in vacuum for a long period of time or if the flow velocity of the liquid is small, then the amount of the gas in the vacuum chamber 4 becomes small and almost all of the liquid may be transformed into solvent vapor.

In such an event, gas including thus formed solvent vapor is sucked into the cylinder 9 in the suction step and compressed in the discharge step, and the solvent vapor returns to liquid again by condensation. Therefore, the pressure rise becomes small and only a small amount or no amount of gas is discharged through the check valve 12.

Furthermore, if vapor is condensed into liquid in the cylinder 9, when the pressure of the cylinder 9 is brought down to a small extent in the subsequent suction step, the condensed liquid evaporates into gas, and therefore the pressure in the cylinder does not decrease so much. Therefore, even if the check valve 8 is opened, the cylinder cannot suck the gas from the chamber 4. To deal with this problem, conventional apparatuses have been equipped with a vacuum pump having a high exhaust speed.

The present invention prevents the reduction of the exhaust speed by having the permeable film 6 and the air-exposure valve 18.

First, in order to prevent the solvent vapor in the vacuum chamber 4 from becoming excessive, the permeable film 6 supplies a small amount of air from the atmosphere, even if the liquid flows at a slow speed.

Further, even if the vapor condenses into a liquid in the cylinder 9, because the air-exposure valve 18 opens according to a control signal from the timer as described above, the outside air enters the cylinder 9 through the valve 18 as the vacuum pump operates, and the air is discharged together with the vapor via the cylinder 14 and the check valve 15. After the liquid in the cylinder 9 dries up, the air-exposure valve 18 is closed by the control of the timer, so that the vacuum chamber 4 starts to be exhausted.

As described above, the valve 18 is controlled by the timer as shown in the time chart of FIG. 3. With this arrangement, the vacuum pump is capable of exhausting gas at a speed equivalent to the case where a vacuum pump is tens of times as large.

When the vacuum chamber 4 is left in a vacuum after the vacuum pump is turned off (as the power is switched off), vapor continues permeating the tube wall in the vacuum chamber 4 until the pressures of the gas and the vapor are balanced. If room temperature fluctuates during this process, vapor may be condensed and transformed into a liquid in the vacuum chamber 4 and may interfere with the next bout of operation of the apparatus. To deal with this situation, another air-exposure valve 7 is provided. This valve may be opened to equate the internal pressure of the chamber 4 to the atmospheric pressure so that the vapor is prevented from permeating the tube wall (this corresponds to sections X and Y in FIG. 3).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A degassing apparatus in which a tube made of permeable film is laid in a vacuum chamber decompressed under control by a vacuum pump and a liquid flowing through said tube is degassed by causing gas to permeate the wall of said tube, characterized in that said vacuum pump can be exposed to the atmosphere by way of a valve disposed between a primary valve and a primary cylinder of said vacuum pump.

2. A degassing apparatus in which a tube made of permeable film is laid in a vacuum chamber decompressed under control by a vacuum pump, and a liquid flowing through said tube is degassed by causing gas to permeate the wall of said tube, characterized in that a valve is disposed so that said vacuum chamber is exposable to the atmosphere, said vacuum pump is exposed to the atmosphere by way of a valve disposed between a primary valve and a primary cylinder of said vacuum pump, and a permeable film is placed between said vacuum chamber and the atmosphere.

* * * * *